United States Patent [19]
Matz et al.

[11] 3,965,484
[45] June 22, 1976

[54] CENTRAL DICTATION SYSTEM

[75] Inventors: Bjorn J. Matz, Forest Hills, N.Y.;
Paul F. Rivers, Old Saybrook, Conn.

[73] Assignee: Dictaphone Corporation, Rye, N.Y.

[22] Filed: Jan. 2, 1975

[21] Appl. No.: 537,924

[52] U.S. Cl. .......................... 360/61; 179/100.1 DR
[51] Int. Cl.² .......................................... G11B 27/16
[58] Field of Search .............................. 360/61, 62; 179/100.1 DR

[56] References Cited
UNITED STATES PATENTS

| | | | |
|---|---|---|---|
| 3,708,633 | 1/1973 | Nye et al. | 179/100.1 DR |
| 3,821,802 | 6/1974 | Nye et al. | 179/100.1 DR |

*Primary Examiner*—James W. Moffitt
*Attorney, Agent, or Firm*—Arthur V. Smith

[57] ABSTRACT

A central dictation system including a plurality of remote dictate stations, a plurality of record/reproduce stations and a plurality of transcribing stations operatively connected to respective ones of the record/reproduce stations. Any one of the remote dictate stations is capable of communicating with any one of the record/reproduce stations so as to execute a dictate and/or playback operation. A transcribing operation is capable of being performed substantially independent of the dictate and/or playback operation and, therefore, may be performed simultaneously therewith. Apparatus is provided for each record/reproduce station to provide an indication of the cumulative amount of record medium upon which dictated information has been recorded which is awaiting transcription. This indication is affected in a first direction when dictation proceeds and is affected in a opposite direction when the dictated information is transcribed. In another embodiment of the present invention, this indication is combined with an efficiency rating of a transcribing operator to produce a signal representing the effective capacity of the record/reproduce station to receive further dictated information. This signal can be compared with similar signals associated with the remaining record/reproduce stations so as to determine which record/reproduce station effectively has the greatest capacity for further recording and to promote the establishment of communication of a remote dictate station with that record/reproduce station.

12 Claims, 4 Drawing Figures

FIG. 3
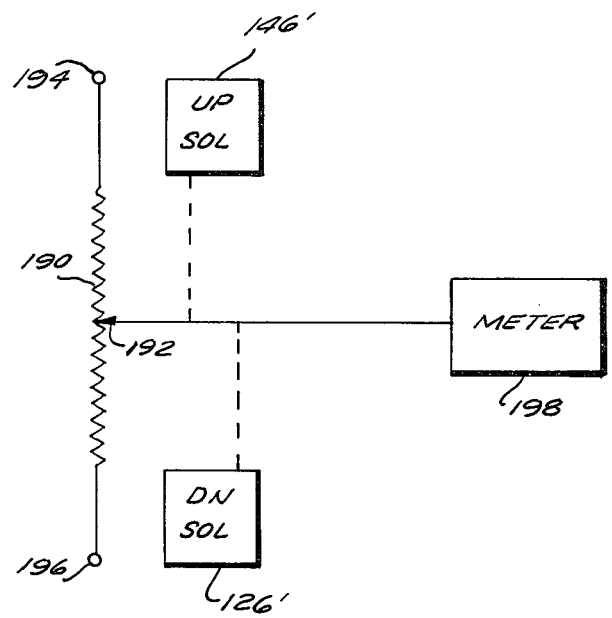
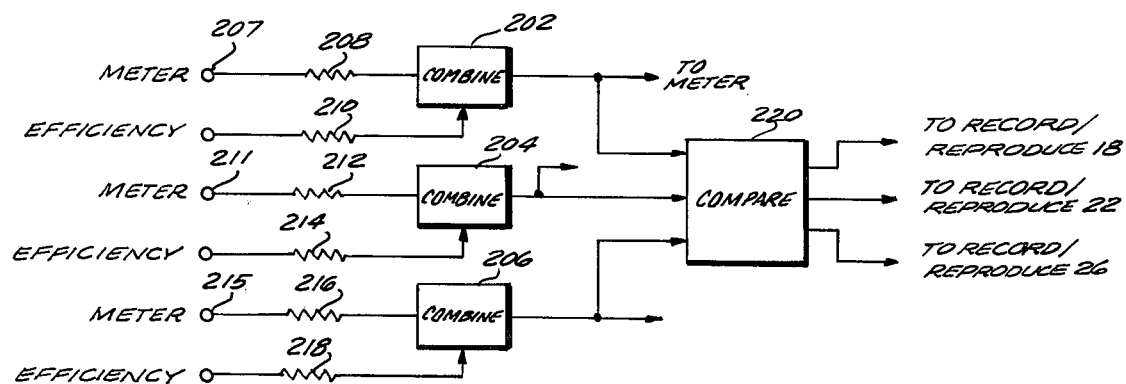
FIG. 4

CENTRAL DICTATION SYSTEM

BACKGROUND OF THE INVENTION

This invention relates to a central dictation system, and in paritcular, to apparatus for providing and for utilizing an indication of the cumulative amount of dictated material awaiting transcription.

Central dictation systems are known wherein a central record/playback unit is adpated to be individually accessed by any one of a plurality of remote dictate stations so as to record dictated information on a record medium. In such systems, the central record/playback unit can be accessed by only a single dictate station at any given time. While one dictate station is in communication with the central unit all other dictate stations are excluded, or locked out, from also communicating with the central unit.

The advantage of such central dictation systems is that individual dictators need not be concerned with the manipulation of various recording media, not need they attend to the time consuming task of delivering recording media having dictation thereon to appropriate personnel for transcription. In the typical central dictation system, a recording medium having a relatively large capacity for recording dictation is provided so that received dictation communicated from a remote dictation station is recorded on the medium and can be subsequently reproduced for transcription. In one type of central record/playback unit, the record medium consists of an endless loop of magnetic tape which is driven past a dictation transducing station and is also driven past a transcribing transducing station. These stations are essentially operated independently of each other so that a dictation operation can be performed simultaneously with and independently of a transcribing operation. Thus, such a central dictation system advantageously permits the efficient use of dictating and transcribing apparatus. Moreover, dictated information can be almost immediately transcribed - an earlier portion of a dictated message being transcribed while dictation still is in progress. A typical prior art central dictation system having an endless loop of magnetic tape is described in U.S. Pat. No. 3,817,436 issued June 18, 1974, and is assigned to Dictaphone Corporation, the assignee of the present invention.

It is preferable, in many applications of a central dictation system, to provide an indication of the amount of dictated material which is awaiting transcription. For a system wherein the record medium is an endless loop of magnetic tape, an indication of the quantity of dictated tape which is awaiting transcription is also an indication of the quantity of tape which is available for further recording. Such indications can be used to evaluate a transcribing operator and/or a dictating operator. In addition, for a central dictation system wherein a plurality of record/playback units are provided, the indication of the quantity of dictated tape awaiting transcription can be used to determine which of the units are approaching their respective capacities and which of the units can be made available for further communication.

In conventional reel-to-reel dictation systems, the quantity of tape which is paid out from a supply reel to a take-up reel are provided in the form of an indexing device, such as a numerical count, or a sliding scale. However, this indication does not afford any representation of the amount of dictated tape which has been transcribed. Hence, the indication is not affected by a transcribing operation; and there is no representation as to the cumulative or net amount of dictated tape which remains for transcription. Also, in these prior art indexing devices, the indication of paid-out tape usually is derived from the reel-driving elements. Accordingly, such indications are produced in response to reel rotation, drive belt movement, gear movement, or the like. Although there usually is a correlation between the operation of such elements and the amount of tape paid-out from the supply reel, a more accurate indication of the quantity of tape so paid-out usually is desired.

It has been proposed that, in a central dictation system wherein an endless loop of magnetic tape is used to record dictated information at a dictation transducing station and from which the dictated information is transcribed at a transcribing transducing station, to provide a tape movement indicating system wherein the net accumulation of dictated tape is indicated. This proposed system requires the use of a differential stepping motor which is mechanically connected to an indicating pointer. As an example, the motor is driven to step up when a quantity of dictated tape issues from the dictation transducing station, and is driven to step down an equal amount when an equal quantity of dictated tape is transcribed.

Unfortunately, an attendant disadvantage of this proposed system is that the use of a differential motor requires a highly precise mechanical instrument which is costly to manufacture and which requires a strict maintenance schedule to maintain in proper working condition. Also, in the proposed system, the differential motor is subject to erroneous operation if a given quantity of dictated tape and the same quantity of transcribed tape are simultaneously moved. In that event, the differential motor might be simultaneously subjected to a step-up and a step-down operation, wherein the resultant effect cannot be predicted and often is erroneous. Accordingly, during prolonged dictate and transcribe operations, the operation of the differential motor can result in cumulative errors such that the indication of dictated tape remaining in the recording/playback unit does not correlate with the actual quantity of such tape.

OBJECTS OF THE INVENTION

Therefore, it is an object of the present invention to provide an improved central dictation system wherein an indication of the cumulative amount of dictation recorded on a record medium which is awaiting transcription.

It is another object of the present invention to provide net dictation indicating apparatus that does not suffer from the defects noted hereinabove.

A still further object of the present invention is to provide an improved dictation system wherein electronic elements are used to provide an indication of the quantity of dictated information awaiting transcription.

A still further object of this invention is to provide apparatus for indicating the net amount of dictation to be transcribed wherein the indication is unambiguously responsive to a simultaneous increase in the quantity of dictated record medium and an increase in the quantity of transcribed record medium.

An additional object of this invention is to provide improved indicating apparatus for a dictation system wherein an indication is provided representing the quantity of record medium upon which dictation has been recorded less the quantity of record medium from which such dictation has been transcribed.

It is an object of this invention to provide indicating apparatus for a dictation system wherein an indication of effective "transcription backlog" is provided.

Yet another object of this invention is to provide an improved central dictation system including a plurality of record/reproduce stations and wherein apparatus is provided for determining which of the record/reproduce stations has the greatest capacity to receive further dictation.

It is a still further object of the present invention to provide an improved central dictation system including a plurality of record/reproduce stations wherein apparatus is provided for determining whether the amount of record medium available for further dictation at a record/reproduce station is less than a predetermined amount.

Various other objects and advantages of this invention will become apparent from the forthcoming detailed description, and the novel features will be particularly pointed out in the appended claims.

SUMMARY OF THE INVENTION

In accordance with this invention, a dictation system is provided wherein a dictation operation and a transcription operation can be performed substantially simultaneously; and wherein an indication is provided of the net amount of dictated information which is awaiting transcription; the indication being a function of the quantity of dictated record medium less the quantity of transcribed record medium. In one embodiment of this invention, the aforenoted indication is combined with a representation of a transcribing operator's efficiency to produce a further indication of the amount of record medium which is effectively available for a further dictation operation. This also provides an indication of the effective "transcription backlog".

BRIEF DESCRIPTION OF THE DRAWINGS

The following detailed description will best be understood in conjunction with the accompanying drawings in which:

FIG. 3 is a schematic representation of one embodiment of apparatus which can be used to provide a visual indication of the net dictation accumulated in a record/reproduce station in the central dictation system; and FIG. 4 is a block diagram representing apparatus which utilizes the net dictation indication to determine which of the record/reproduce stations in the central dictation system is available to receive further dictation.

DETAILED DESCRIPTION OF A CERTAIN ONE OF THE PREFERRED EMBODIMENTS OF THE PRESENT INVENTION

The Central Dictation System

Figure 1:
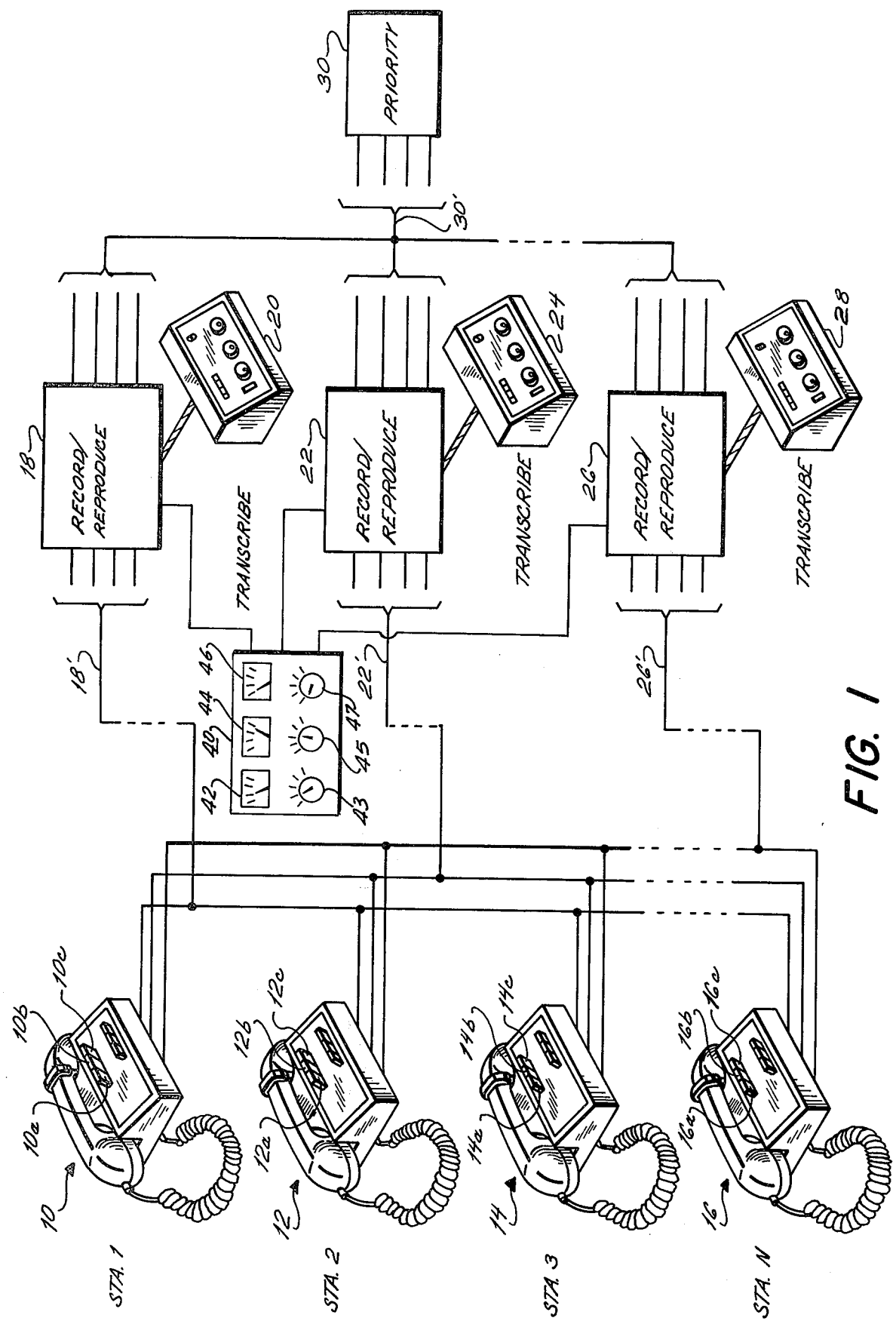
FIG. 1 is a block diagram representing a central dictation system of the type wherein the present invention finds ready application.

Referring now to the drawings and, in particular, to FIG. 1, there is illustrated a block diagram representing a central dictation system comprised of a plurality of remote dictate stations, a plurality of record/reproduce stations and a plurality of transcribe stations. Also shown is a supervisory console. As depicted, N remote dictate stations can be provided and, in the interest of simplification, only four dictate stations 10, 12, 14 and 16 have been shown. Similarly, although any convenient number of record/reproduce stations can be provided, only three such stations 18, 22 and 26 have been shown. Typically, the record/reproduce stations may be provided at a central location and the remote dictate stations may be provided at any convenient locations and may be separated from the central location by any suitable distance. For example, the remote dictate stations may be situated in various separate offices in an office building and the central location may be situated at a designated centralized location in such office building.

A typical record/reproduce station 18 is comprised of a record medium such as an endless loop of tape, in combination with various transducing heads, tape drive mechanisms, audio electronics and control apparatus for effecting the recording and reproduction of audio information for achieving dictation and transcription operations. The record medium included in the record/reproduce station is adapted to be driven so as to traverse a dictation site having a magnetic transducer such as a combination record/playback/erase head, and a transcription site, also having a magnetic transducer such as a playback head. Although physically contained within the same structure, the dictation and transcription sites are independently operated. In addition, since dictation can proceed without a concurrent transcription operation, tape which has been dictated and which is awaiting transcription is adapted to be stored in serpentine fashion within a tape housing storage location between the dictation and transcription sites. Also, since transcription can proceed without a concurrent dictation operation, magnetic tape which has been transcribed and is awaiting subsequent reuse at the dictation site is adapted to be stored, also in serpentine fashion, at another location between the dictation and transcription sites. Accordingly, the record/reproduce station can be similar to the record/playback unit described in U.S. Pat. No. 3,817,436.

Since each remote dictate station is capable of communicating with any of the record/reproduce stations 18, 22 and 26, each record/reproduce station is connected to each of the remote dictate stations by a conducting cable. Accordingly, the record/reproduce station 18 is connected by a conducting cable 18' to the N remote dictate stations. As shown, these remote dictate stations are connected in parallel to the conducting cable 18'. Similarly, the record/reproduce station 22 is connected via a condicting cable 22' to each of the N remote dictate stations. So also, a conducting cable 26' connects the record/reproduce station 26 to each of the N remote dictate stations. Although all of the illustrated remote dictate stations are connected in parallel to each of the record/reproduce stations, only a single dictate station can communicate at any given time with a single record/reproduce station. Hence, in a typical installation comprised of many more remote dictate stations than there are record/reproduce stations, it will be appreciated that, when each of the record/reproduce stations is communicating with a remote dictate station, any additional remote dictate station will be precluded from gaining access to a record/reproduce station. Suitable seizure and privacy control circuits are provided for this purpose.

A typical remote dictate station, such as the dictate station 10, is comprised of audio and function control apparatus which is connected by a conducting cable through a plurality of switches 10a, 10b and 10c to the conducting cables 18', 22' and 26', respectively. The purpose of the switches 10a–10c is to permit an operator at the dictate station 10 to select a particular record/reproduce station to which audio information and function control commands are to be transmitted and, in the interest of simplification, only three such switches have been shown. The switches 10a–10c may, therefore, comprise conventional push button-type switches having visual indicators, such as lamps, associated or integral therewith. The purpose of such lamps is to indicate when a particular record/reproduce station is unavailable to be accessed by a remote dictate station, such as when that record/reproduce station is then communicating with another dictate station or when the capacity of record medium to receive dictated information has been exhausted, and to thus enable an operator to properly select an available record/reproduce station for communication. Thus, if the record/reproduce station 18 is available, an operator at the remote dictate station 10, by depressing the switch 10a will connect the audio and control function electronics at the dictate station 10 to the record/reproduce station 18 via the conducting cable 18'. Similarly, if the record/reproduce station 22 is available, the switch 10b, upon being closed, will connect the audio and control function electronics to the record/reproduce station 22 via the conducting cable 22'. The operation of the switch 10c effects a similar connection between the remote dictate station 10 and the record/reproduce station 26. If a switch associated with an unavailable record/reproduce station is depressed, the remote dictate station will not be operably connected thereto and, in one embodiment, a distinctive signal, such as a predetermined tone, will be returned to the remote dictate station to signify the unavailability of the selected record/reproduce station. The privacy and seizure control circuitry which insures that only a single remote dictate station can gain access to a record/reproduce station may be of the type described in U.S. Pat. No. 3,835,261, which issued on Sept. 10, 1974 and is assigned to the assignee of the present invention. A signal which is extended to all remote dictate stations from a record/reproduce station to indicate the status, i.e., availability, of such record/reproduce station is transmitted over one of the conducting channels included in the conducting cable, such as cable 18'.

The various function commands generated from each of the remote dictate stations are transmitted to a record/reproduce station over another conducting channel included in the conducting cable, such as cable 18'. These command signals are constant currents of predetermined magnitudes and are generated in response to the selective manual operation of various switches disposed at the dictate station, typical of such function commands are "dictate", "rewind", "stop", "play", and "fast forward". Each of these command signals serves to control the movement of tape past the dictation transducer site and, additionally, conditions the dictation transducer for a record or playback mode of operation. The generation, detection and use of these command signal are described in detail in copending Application Ser. No. 536,753, filed Dec. 27, 1974. An example of mechanical driving apparatus which is used to move the magnetic tape is disclosed in co-pending Application Ser. No. 536,856, filed Dec. 27, 1974.

Audio signals are transmitted from a remote dictate station to a record/reproduce station during dictation and are returned to the remote dictate station during a review of recorded information via a further conducting channel included in the conducting cable, such as conducting cable 18'. A further conducting channel included in the conducting cable is adapted to extend the system reference potential, such as ground to a remote dictate station when the record/reproduce station is properly accessed by the remote dictate station.

In a typical remote dictate station, the sound transducers for converting sound signals into audio signals and for transducing audio signals into sound signals are provided as conventional microphone and loudspeaker. Such sound transducers are contained in a handset which is associated with various function control switches. Typically, the handset is adapted to be supported on a cradle having a cradle switch which is actuated when the handset is removed to thereby gain access to a record/reproduce station and is deactuated when the handset is returned to the cradle upon the completion of a dictation operation. To insure that subsequent dictated information which might be derived from another remote dictate station is not recorded over previously recorded information, the deactuation of a cradle switch results in the automatic recording of a predetermined code signal immediately following a recorded message. This predetermined code signal is sensed when the tape is reversed past the dictation transducer site to automatically prevent further tape bearing prerecorded information from also being reversed past the dictation transducer. Thus, a subsequent dictation operation will not affect previously recorded information; nor will such previously recorded information be reproduced during a subsequent dictation or playback operation. The recording of such predetermined code signal and the sensing thereof is described in detail in co-pending Application Ser. No. 536,754, filed Dec. 27, 1974.

Although each of the remote dictate stations is here illustrated as including plural station selecting switches, such as switches, 10a, 10b and 10c, to thereby permit an operator to manually select a desired record/reproduce station for communication, in an alternative embodiment such manual selecting switches are replaced by an automatic switching matrix. Such switching matrix is conventional and is of the type generally used in telephone switching applications. When such an automatic switching matrix is used, a remote dictate station is automatically connected to the first record/reproduce station which becomes available. The conditioning of a record/reproduce station with respect to its availability can be a function of the amount of unused tape present therein and upon which information can be recorded, as will be described in greater detail hereinbelow.

As a further feature of the central dictation system illustrated in FIG. 1, an additional predetermined record/playback unit 30 is provided and is intended to receive dictated information for recording when such information is of a high priority of importance. As shown, the priority unit 30, which may be similar to the record/reproduce stations 18, 22 and 26, is connected by a conducting cable 30' to each of the record/reproduce stations 18, 22 and 26. The cable 30' may include multiple conducting channels such as are included in each of the cables 18', 22' and 26'. The record/reproduce stations 18, 22 and 26 are connected in parallel to the conducting cable 30' by additional cables, each including multiple conducting channels. Accordingly, the priority unit 30 bears the same relationship to each of the record/reproduce stations as a record/reproduce station bears to each of the remote dictate stations. When a "transfer" function command is transmitted from a remote dictate station to a record/reproduce station in communication therewith, such "transfer" command results in the switching of, for example, the dictate station 10 from communicating with, for example, the record/reproduce station 18, to now communicate with the priority unit 30. A conducting path will thus extend from the cable 18', through the record/reproduce station 18 to the cable 30' and to the priority unit 30. While the remote dictate station is in communication with the priority unit, the record/reproduce station 18 will not be operatively coupled to the remote dictate station, but will maintain a quiescent or stand-by condition until communication with the priority unit is completed. This feature is described in greater detail in the aforenoted co-pending application No. 536,753, filed Dec. 27, 1974.

Each of the record/reproduce stations 18, 22 and 26 is connected to a transcribe station 20, 24 and 28, respectively. By suitable operation thereof, an operator of a transcribe station causes various transcribe control function signals to be transmitted to the associated record/reproduce station to thereby control the movement of the recording tape past the transcription transducer site so as to facilitate a transcribing operation. Generally, the transcribe station is provided with suitable switches, such as foot-pedal actuated switches, to control the movement of the tape past the transcription transducer site. A speed control switch is provided to accomodate variations in tape speed or to deliberately alter the tape speed, as desired. In addition, a sound reproducer, such as a loudspeaker or headphones, is provided to receive reproduced audio signals, and suitable audio electronics are provided to permit an adjustment in the reproduced sound, as desired. Also, and as will be described below, a counting device is provided to present a count representing the total amount of tape which has been transcribed by that transcribe station. The count indication can be used as an indication of the productivity of a transcribe operator.

The recorded code signals, although serving to ensure the confidentiality of a previously dictated message so that this message cannot be played back or altered by the subsequent operation of a remote dictate station, serves the additional function of implementing a scanning operation during a transcription mode of operation. That is, since the code signals are recorded at the start of a dictated message, the tape can be rapidly scanned so that if each code signal is detected and indicated, a count of such indications will identify a particular dictated message. Hence, although messages are recorded in sequence, any message can be accessed for transcription regardless of its sequential position merely by counting the code signal indications until a desired message is reached.

It is possible that, during a transcribing operation, the amount of tape having dictated information thereon and awaiting transcription is exhausted, but a complete message has not been transcribed. Until additional tape is paid out from the dictation transducer site, further transcription is inhibited. However, if the record/reproduce station is not communicating with a dictate station, there normally will not be this requisite advance of tape until the record/reproduce station is subsequently seized by a dictate station, and transcription will be delayed until that time. This delay is avoided by an automatic advance of a predetermined amount of tape from the dictation transducer site to enable the completed transcription of an entire dictated message, as is described in detail in co-pending Application Ser. No. 536,753, filed Dec. 27, 1974.

As shown, the central dictation system includes a supervisory console 40 to supervise the operations of the record/reproduce station, the transcribe stations and the priority unit. Suitable switching apparatus is provided such that each transcribe station is connected through the supervisory console to its associated record/reproduce station. In this configuration, a supervisor can, if desired, connect transcriber 20, for example, to the record/reproduce station 22. Such a connection might be preferred so as to not require an operator at, for example, the transcribe station 20 to relocate at, for example, the transcribe station 24 in order to transcribe the dictated information recorded at the record/reproduce station 22. Also, the skills of a particular transcriptionist may be readily matched to the amount of dictated tape awaiting transcription in a particular record/reproduce station. Furthermore, a supervisory operator may intentionally dispose an otherwise available record/reproduce station into its "unavailable" condition if it is determined that the capaicty of the record/reproduce station to receive additional dictation will soon be reached while another record/reproduce station exhibits far more acceptable capacity.

The supervisory console 40 includes indicators 42, 44 and 46 associated with record/reproduce stations 18, 22 and 26, respectively, to provide indications of the effective "transcription backlog" of each record/reproduce station. That is, each meter indicates the net amount of dictated information which is awaiting transcription at an associated record/reproduce station. Such an indication is used to control the availability of a record/reproduce station and might also be used to match the skills of a transcriptionist to a particular condition. The manner in which this indication is provided and used is described in detail below.

The supervisory console also is provided with audio communication equipment to permit a supervisory operator to communicate with an operator at a remote dictate station, if desired, and further includes switching devices to manually transfer such a remote dictate station from communication with a record/reproduce station to communication with the priority unit.

The foregoing general description of a central dictation system of the type depicted in FIG. 1 is merely intended as a broad discussion of various functions, operations and features of such system and is not to be construed as limiting the central dictation system only to those features which have been described.

Indicating Apparatus

Figure 2:
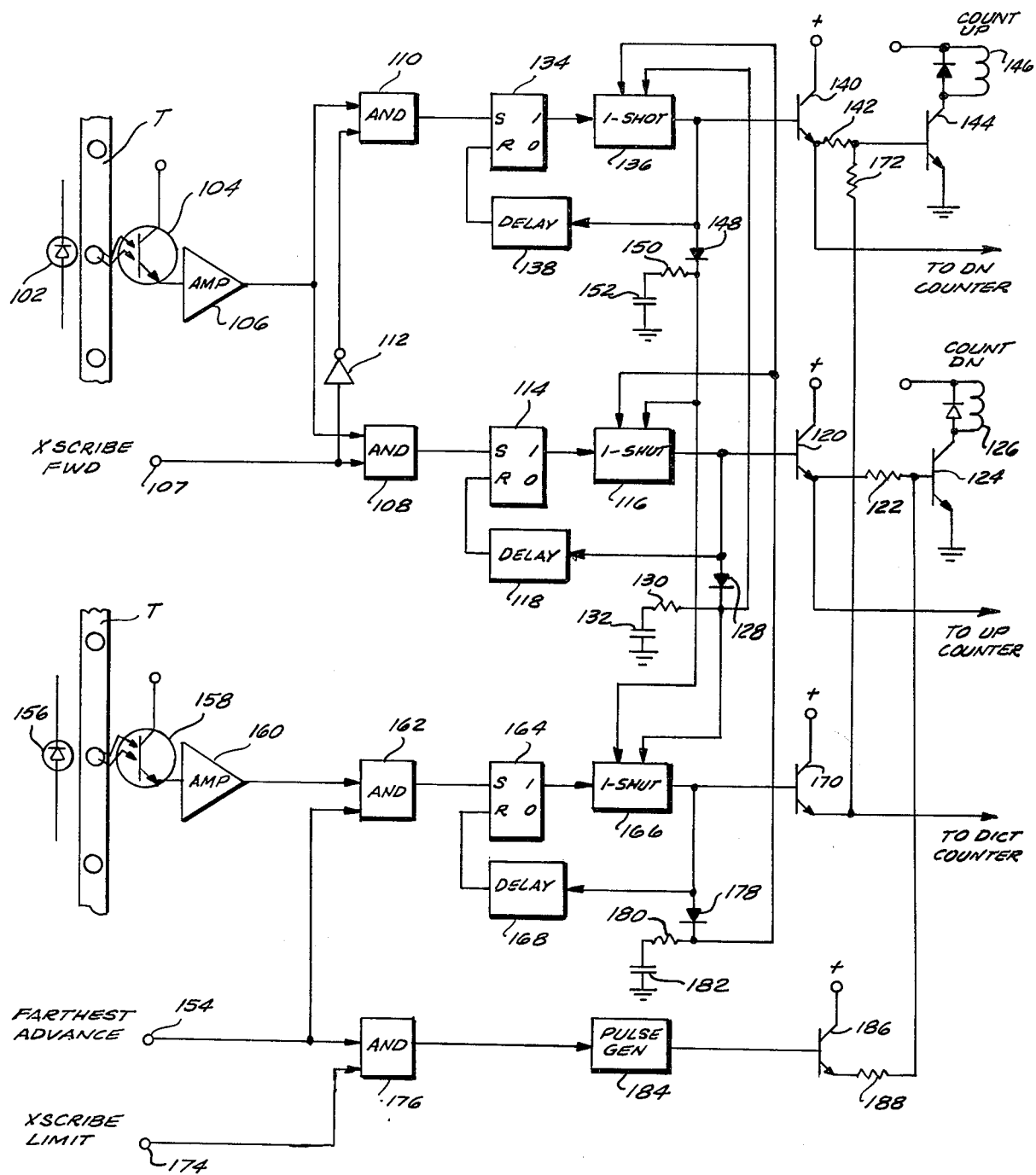
FIG. 2 is a schematic diagram representing the net dictation indicating apparatus in accordance with one embodiment of the present invention.

Referring now to FIG. 2, a schematic diagram is shown representing indicating apparatus for providing an indication of the net dictation which is awaiting transcription. It is appreciated that this indication represents the amount of tape upon which information has been dictated, less the amount of tape from which the dictated information has been transcribed. Accordingly, this illustrated apparatus is capable of providing an indication of the effective "transcription backlog" as well as indications of the total amount of information which has been dictated and information which has been transcribed.

It will be appreciated that, when tape T is advanced past a dictation transducer site so as to receive a dictated message, the net dictation indication should be increased. However, as a portion of previously dictated tape is reversed with respect to the dictation transducer, as during a review operation, and then again advanced during a playback or revision mode of operation, the previous indication of net dictation should not be altered. Similarly, when dictated tape is advanced past a transcription transducer site to effect a transcribing operation, the indication of net dictation should be reduced. However, during a transcribing operation, since it is not unusual for a transcribing operation to review a substantial portion of a dictated message prior to the transcription thereof, it is preferred that, when the tape T is reversed with respect to the transcription transducer, the indication of net untranscribed dictation should be increased.

Therefore, to summarize, it is preferred to increment a net dictation indication during a dictating mode, but this indication should not be altered during a review or playback mode. Also, during a reporducing operation at the transcription transducer site, the net dictation indication should be reduced. However, when previously dictated tape which had been advanced past the transcription transducer is subsequently reversed with respect to this transducer, the prior reduction in the net dictation indication should be compensated, i.e., increased. It is a feature of the present invention to attain the aforedescribed function. This function is performed by the apparatus schematically illustrated in FIG. 2.

It is recognized that, during a recording and a reproducing operation the magnetic tape T is moved past a transducer, such as a record/playback head, at a substantially constant speed. Accordingly, a discrete quantity of dictation can be measured in either time or tape length. It is seen that since the tape is moved at a constant speed, a measurement of a length of tape is equivalent to a measurement of time. Therefore, in the preferred embodiment of the present invention, discrete lengths of tape are measured so as to provide a cumulative indication of a quantity of dictation. To this effect, indicia are provided at selected locations along the length of tape, such indicia being spaced at equal lengths. For example, if the tape is moved at a speed of 15/16 inches per second, and if the indicia are spaced at 15 inch intervals, then each indicium represents 16 seconds of dictation. It is, of course, recognized that the indicia may be spaced apart at any desired distance so as to represent a corresponding time-related quantity of dictation. In a preferred embodiment, the indicia are provided as holes in the tape and may be provided at any suitable longitudinal axis therealong. Alternatively, the indicia may comprise light reflective elements, light absorption elements, magnetic indicia or any other suitable element capable of being detected and of being utilized to provide an output indication.

Where the indicia comprise holes or other elements which can be detected by photo-optical techniques, indicia detectors are provided at the dictation transducer and transcription transducer sites, respectively. For example, the detector may comprise a source of radiant energy, such as an LED or other source of light capable of transmitting light to a photoreceptor, such as a phototransistor. A hole is thus sensed when light is transmitted therethrough and impinges upon the phototransistor. Alternatively, the indicia are detected when light is reflected therefrom or when light is absorbed thereby and is not received by the phototransistor.

At the dictation site, a source of light 156 is adapted to be in optical communication with a phototransistor 158 when a hole is detected. Similarly, at the transcription site, a source of light 102 is adapted to be in optical communication with a phototransistor 104 when a hole is sensed. The output of the phototransistors 158 and 104 are coupled to amplifiers 160 and 106, respectively With respect to the indicia detector at the dictation site, the output of the amplifier 160 is coupled through a coincidence circuit 162 to a flip-flop circuit 164. As is well known, a coincidence circuit is adapted to produce an output signal when input signals are simultaneously applied to each input thereof. A typical coincidence circuit is comprised of an AND gate which is a conventional logical element capable of producing, for example, a binary 1 when each input thereof is supplied with a binary 1. When any input of an AND gate is supplied with a binary 0, a resultant binary 0 is produced. For the purpose of the present explanation, a binary 1 may be represented by a positive DC voltage of a relatively higher level, and a binary 0 may be represented by a relatively lower level DC voltage. If desired, the binary signal representing voltage may be reversed, their polarities may be interchanged or other potential levels may be used to indicate such binary parameters.

The flip-flop circuit 164 is a conventional set/reset bistate device, such as a bistable multivibrator, having a set input connected to the AND gate 162 and a reset input connected to a delay circuit 168 for a purpose soon to be described. As is understood by those of ordinary skill in the art, the flip-flop circuit 164 is adapted to assume its set state in response to a binary 1 applied to its set input, thereby producing a binary 1 at its 1 output. Conversely, when a binary 1 is applied to its reset input, the flip-flop circuit 164 is driven to its reset state, and a binary 0 is provided at its 1 output. As shown, the 1 output of the flip-flop circuit 164 is connected to a one-shot circuit 166.

A one-shot circuit is a conventional element which is adapted to respond to a triggering signal applied thereto to thereby produce an output signal for a predetermined time duration. Accordingly, a one-shot circuit may comprise a monostable multivibrator. For the purpose of the present discussion, the one-shot circuit 166 is adapted to produce an output pulse of predetermined duration in response to a binary 1 applied to its input terminal. In addition, the one-shot circuit includes inhibit input terminals which, when provided with a binary 1 act to inhibit the operation of the one-shot circuit until the inhibit signal is removed. As is illustrated, the one-shot circuit 166 includes a first inhibit terminal adapted to receive a first inhibit signal supplied from a one-shot circuit 136, and a second inhibit input terminal adapted to receive an inhibit signal supplied by a one-shot circuit 116, soon to be described.

The output of one-shot circuit 166 is coupled through the delay circuit 168 to the reset input of the flip-flop circuit 164. In addition, the one-shot circuit output is coupled through a diode 178 to a timing circuit formed of a resistor 180 connected in series with a capacitor 182. The output signal derived from this timing circuit is utilized as an inhibit signal to be supplied to first inhibit terminals of the one-shot circuits 116 and 136, respectively. The output of the one-shot circuit 166 is further connected to a driver transistor 170. The collector electrode of this driver transistor is supplied with an operating potential and the emitter electrode thereof is connected to a dictate counting device and, additionally, through a resistor 172 to a coil driving transistor 144. The dictate counting device, not shown, is adapted to provide an indication of the total amount of tape which has been advanced past the dictation transducer site. Hence, the dictate counting device may comprise a conventional mechanical digital counter, or the like, or may be of the type described in detail in co-pending Application Ser. No. 536,857, filed Dec. 27, 1974.

The delay circuit 168 is provided to delay the resetting of the flip-flop circuit 164 to thereby provide sufficient time for the one-shot circuit to assume its unstable state so as to provide the aforenoted output pulse. If the delay circuit were omitted and the flip-flop circuit 164 were to be reset by the one-shot circuit 166, it is possible that the flip-flop circuit would be reset before the one-shot circuit has an opportunity to satisfactorily assume its unstable state. Of course, the delay circuit may be omitted if suitable compatible elements comprising the flip-flop circuit and one-shot circuit are provided to perform the aforenoted function.

The AND gate 162 includes another input adapted to receive a signal supplied to the terminal 154 and representing a farthest advance function. Although not shown herein, the record/reproduce station at which the illustrated apparatus is provided includes a farthest advance circuit which is adapted to sense when the magnetic tape, after being reversed to some previously dictated position and then advanced at a relatively fast speed, arrives at that point at which dictation previously was interrupted. This point is designated the farthest advance point because it is the farthest point at which the dictator had advanced the tape. During a normal dictate operation, a farthest advance signal will be provided at the terminal 154. However, during a playback mode, when a previously recorded portion of tape is reviewed, the farthest advance signal will not be provided. A typical circuit adapted to provide a farthest advance signal may be of the type described in U.S. Pat. No. 3,823,274. Suffice it to say that, when the farthest advance signal is present, a binary 1 is applied to the terminal 154. As will soon become apparent, an indication of the indicia disposed along the length of tape T detected at the dictation site will be utilized only if the farthest advance signal is provided.

At the transcription site, the amplifier 106 is connected in common to an input of the AND gates 108 and 110, respectively. These AND gates are adapted to detect when the indicia are sensed during a transcribe mode or a review mode of operation. Accordingly, a transcribe forward signal is adapted to be supplied to a terminal 107 when the tape T is moved in a forward direction past the transcription transducer. This signal, which may be a binary 1 is provided when the tape T is moved to reproduce previously dictated information, as during a transcribing operation. Conversely, a binary 0 is supplied to the terminal 107 when the tape T is moved in a reverse direction past the transcription transducer, as during a review operation. The terminal 107 is connected to another input of the AND gate 108 and, through an inverting circuit 112, to another input of the AND gate 110. As is understood by those of oridinary skill in the art, an inverting circuit is a conventional logic element capable of inverting the sense of a binary signal so that a binary 1 is inverted to a binary 0 and, conversely, a binary 0 is inverted to a binary 1.

The AND gate 108 is connected to the set input of the flip-flop circuit 114, the one output thereof being connected to a one-shot circuit 116. Similarly, the AND gate 110 is connected to the set input of a flip-flop circuit 134, the 1 output thereof being connected to a one-shot circuit 136. The flip-flop circuit 114 is interconnected with the one-shot circuit 116 by a delay circuit 118, these elements being disposed in the same configuration previously described with respect to the flip-flop circuit 164, the one-shot circuit 166 and the delay circuit 168. Accordingly, the output of the one-shot circuit 116 is connected through a diode 128 to a timing circuit formed of a resistor 130 connected in series with a capacitor 132. As is appreciated, the output derived from this timing circuit is used as an inhibit signal which is supplied to the respective inhibit terminals of the one-shot circuits 136 and 166, respectively. The output of the one-shot circuit 116 is further connected to a driver transistor 120 which is disposed in emitter-follower configuration and has its emitter electrode connected to a count-up portion of a transcribe counting device. The transcribe counting device may be similar to the aforedescribed dictate counting device and additionally includes count-up and count-down portions. The count displayed by such a transcribe counting device represents the amount of tape which has been transported past the transcription transducer site. This count will be incremented when the tape is advanced, as during a transcribing operation, and will be decremented when the tape is reversed, as during a review operation.

The emitter electrode of the transistor 120 is additionally connected by a resistor 122 to a coil driving transistor 124. This latter transistor is connected to count-down solenoid energizing coil 126, the energizing coil being adapted to actuate a count-down solenoid of the type described in co-pending Application Ser. No. 536,857, filed Dec. 27, 1974. As described therein, this solenoid is mechanically connected to an indexing device formed of solenoid-activated pawls which engage ratchet wheel elements. When the count-down solenoid is actuated, a corresponding ratchet wheel element is incrementally rotated to thereby advance the wiper element of a potentiometer, the purpose of which will described below.

The flip-flop circuit 134 and one-shot circuit 136 are interconnected in a circuit configuration including a delay circuit 138 which is substantially similar to the configuration exhibited by the flip-flop circuit 164, one-shot circuit 166 and delay circuit 168. As is shown, the output of the one-shot circuit 136 is connected by a diode 148 to a timing circuit formed of a resistor 150 connected in series with a capacitor 152. The output signal derived from this timing circuit is used as an inhibit signal to be supplied to the inhibit input terminals of the one-shot circuits 116 and 166, respectively.

The output of the one-shot circuit 136 is additionally connected to a driving transistor 140 disposed in emitter-follower configuration and having its emitter electrode connected to a count-down portion of the aforedescribed transcriber counting device. As will be recognized, the count-down portion of this counting device is adapted, when activated, to decrement the count displayed thereby. Hence, if this transcriber counting device is used as an indication of the volume of dictated information which is transcribed, a review operation at the transcription site results in the activation of the count-down portion of this counting device to correspondingly decrement the indicated volume.

The emitter electrode of the driving transistor 140 is additionally connected by a resistor 142 to the coil driving transistor 144, this latter transistor being connected to a count-up solenoid energizing coil 146. The count-up solenoid activated in response to the energization of the count-up energizing coil 146 is adapted to operate a pawl and ratchet wheel combination which serves to move the wiper element of the aforenoted potentiometer by an equal but opposite amount than is obtained when the count-down solenoid energizing coil is energized.

As will soon be described, the potentiometer which is variably positioned in response to the energization of the count-down and count-up energizing coils 126 and 146 is adapted to provide an output voltage having a magnitude proportional to the net quantity of dictated information awaiting transcription. It is preferred that, when all dictated tape has been transcribed, the potentiometer output voltage be referenced to a predetermined level. That is, when all of the dictated messages have been transcribed, the wiper element of the potentiometer should be positioned at a stop. This positioning of the potentiometer wiper element is attained by an AND gate 176 which is connected to a pulse generator 184. One input of the AND gate is connected to the terminal 154 and is capable of receiving the aforedescribed farthest advance signal. The other input of the AND gate 176 is connected to a terminal 174 to which a transcribe limit signal is supplied. The transcribe limit signal is produced by suitable apparatus, not shown, when all of the dictated tape has been transcribed. The manner in which this signal is produced is described in further detail in co-pending Application Ser. No. 536,754, filed Dec. 17, 1974.

The output of the AND gate 176 is connected to the pulse generator 184 which is adapted to produce a plurality of pulse signals in response to an activating signal applied thereto. The pulse generator output is connected to a driver transistor 186 which is disposed in emitter-follower configuration such that its emitter electrode is connected by a resistor 188 to the coil driver transistor 124.

Before describing the operation of the indicator control apparatus illustrated in FIG. 2, reference is made to the visual indicating device schematically illustrated in FIG. 3. As shown, a potentiometer 190 is connected across a source of reference voltage provided at terminals 194 and 196. The potentiometer is conventional and includes a wiper element 192 which is adapted to be positioned such that a proportional amount of the reference is derived by the particular positioning of the wiper element. The wiper element 192 is connected to an indicator, such as a meter 198, which is adapted to provide an indication corresponding to the voltage derived by the wiper element. The meter thus may comprise a conventional volt meter that is calibrated in time and/or tape length to represent a quantity of dictation awaiting transcription. The meter may comprise a conventional digital volt meter, analog volt meter, or the like. As is appreciated, this meter corresponds to the illustrated meters 42, 44 and 46 of FIG. 1.

A count-down solenoid 126' is mechanically coupled to the wiper element 192 and a count-up solenoid 146' also is mechanically connected to the wiper element. In response to each energization of the count-down solenoid 126' the wiper element 192 is moved in a first direction such that the voltage derived thereat is reduced. Each sequential reduction in the voltage derived at the wiper element is seen to decrement the indication provided by the meter 198. Conversely, each energization of the count-up solenoid 146' serves to move the wiper element 192 in an opposite direction so that the voltage derived thereat is increased. Sequential energizations of the count-up solenoid are seen to increment the indication provided by the meter 198. Thus, depending upon the difference between the respective solenoid energization, the meter provides an indication of the net quantity of dictated tape which is awaiting transcription. Accordingly, the meter provides an indication of the "transcription backlog" of the record/reproduce station.

In operation, let it be assumed that a dictate operation and a transcribe operation are being performed substantially simultaneously. During the dictate operation, when a predetermined length of tape T is advanced past the dictation transducer, a corresponding indicium thereon is sensed such that the phototransistor 158 produces an output pulse which is amplified and supplied to the AND gate 162. If a recording operation, as opposed to a playback operation, is being performed, the fastest advance signal will be supplied to the terminal 154 and the AND gate 162 will supply a binary 1 to the set input of the flip-flop circuit 164 to thereby set this flip-flop circuit.

When this flip-flop circuit assumes its set state, a binary 1 is supplied as a triggering input signal to the one-shot circuit 166 which thereby produces an output pulse of predetermined duration. This output pulse is produced provided that an inhibit input signal is not supplied to the one-shot circuit. It will be assumed that such inhibit signals are not applied in this instance. After a suitable delay established by the delay circuit 168, sufficient to enable the elements comprising the one-shot circuit 166 to be sufficiently energized, the flip-flop circuit 164 is reset. In addition, the pulse produced by the one-shot circuit now inhibits the one-shot circuits 116 and 136 from responding to triggering input signals that might be applied thereto at this time. Also, the one-shot circuit output pulse is supplied by the driver transistor 170 to the dictate counting device and, additionally, to the coil driver transistor 144 to thereby energize the count-up solenoid energizing coil. Consequently, the dictate counting device is incremented and, moreover, the count-up solenoid 146' is actuated to thereby move the wiper element 192 of the potentiometer 190 such that an incrementally higher voltage now is applied to the meter 198. The meter thus indicates that a quantum of dictation is awaiting transcription.

If, at any time during the duration of the pulse by the one-shot circuit 166 or the time period determined by the time constant of the timing circuit formed of the resistor 180 and capacitor 182, a predetermined length of tape T is advanced or reversed with respect to the transcription transducer, it is appreciated that the one-shot circuits 116 and 136 will be inhibited until after the count-up solenoid energizing coil 146 is first energized and then restored to its de-energized, quiescent condition. That is, neither the count-up solenoid nor the count-down solenoid will be subsequently energized until the respective mechanical time constants thereof have expired. This permits an appropriate indication to be registered unambiguously.

If, for example, a predetermined length of tape had been advanced past the transcription transducer during the interval defined by the pulse duration of the one-shot circuit 166 plus the time constant of the timing circuit formed of the resistor 180 and the capacitor 182, it is appreciated that the flip-flop circuit 114 will be set during this interval. This obtains because the phototransistor 104 supplies a pulse through the amplifier 106 to the AND gate 108 which is enabled to transmit this pulse to the set input of the flip-flop circuit 114 when a transcribe forward signal is applied to the terminal 107. Now, when the capacitor 182 sufficiently discharges after the termination of the pulse produced by the one-shot circuit 166, it is appreciated that the one-shot circuit 116 no longer will be supplied with an inhibit input signal. Accordingly, the set state assumed by the flip-flop circuit 114 now actuates the one-shot circuit 116 which, in turn, produces an output pulse of predetermined duration. This output pulse is supplied as an inhibit input signal to the remaining one-shot circuits 136 and 166 and, additionally, is supplied by the driver transistor 120 to the count-up portion of the transcribe counting device. Thus, the transcribe counting device indicates that a quantum of dictated tape has been transcribed.

Also, the pulse produced by the one-shot circuit 116 is seen to actuate the coil driving transistor 124 such that the count-down solenoid energizing coil 126 is energized. This causes the count-down solenoid 126' to be activated which moves the wiper element 192 in a direction such that the output voltage derived thereby is incrementally reduced. Consequently, the indication of dictated tape awaiting transcription, as provided by the meter 198, is decremented.

After a suitable delay, sufficient to permit the elements comprising the one-shot circuit 116 to be fully energized, the flip-flop circuit 114 is reset by the delayed pulse applied to its reset input by the delay circuit 118. As is also recognized, after the capacitor 132 has sufficiently discharged following the termination of the pulse produced by the one-shot circuit 116, the remaining one-shot circuits 136 and 166 are conditioned to respond to the next triggering input signals which may be applied thereto.

Thus, it is seen that the meter 198 provides an indication of the difference between the quantum of dictation which is produced and the quantum of that dictation which is transcribed. Hence, if a dictation operation is performed at a faster rate than a transcription operation, the meter 198 provides an incrementally increasing indication. However, if the rate of transcription exceeds the rate of dictation, the meter 198 provides a decrementally decreasing indication.

If, during a transcribing operation, a transcribe operator wishes to review a portion of tape which previously had been transcribed or from which a dictated message or portion thereof had been reproduced, the tape T will be reversed with respect to the transcription transducer and a binary 0 representing this reverse motion is supplied to the terminal 107. Now, when a predetermined length of tape T is reversed past the transcription transducer, light impinges upon the phototransistor 104 and a pulse is supplied through the amplifier 106 and the AND gate 110 to the flip-flop circuit 134. It is appreciated that, during such reversed tape motion, the signal applied to the terminal 107 is effective to condition the AND gate 110 to respond to pulses supplied by the phototransistor.

The flip-flop circuit 134 thus assumes its set state and, if the one-shot circuit 136 is not inhibited from responding thereto, the flip-flop circuit supplies a triggering input signal to the one-shot which, in turn, produces a pulse of predetermined duration. This output pulse produced by the one-shot circuit 136 is supplied through the transistor 140 to the count-down portion of the transcribe counting device and, additionally, results in the energization of the count-up solenoid energizing coil 146. Thus, it is appreciated that when the tape T is reviewed at the transcription transducer site, the indication provided by the meter 198 is equivalent to the indication which would be provided if additional dictation had been produced. Also, a reversal in the direction of movement of the tape T results in a corresponding change in the count provided by the transcribe counting device. Thus, it is seen that the transcribe counting device is operated to provide a generally accurate indication of the net amount of tape which has been transcribed. Similarly, the meter 198 is operated to provide a generally accurate indication of the "transcription backlog," or total amount of untranscribed dictation. It is appreciated that this also indicates the amount of tape which is available to record for the information.

From the foregoing, it is appreciated that the purpose of the flip-flop circuits 114, 134 and 164 is to store a representation of a detected indicium until such stored representation can be effectively used. That is, if the one-shot circuit associated with a flip-flop circuit is inhibited from producing an output pulse because a solenoid either is being activated or has not yet fully restored to its quiescent condition, at the time that an indicium is detected, this indicium will not be lost. On the contrary, a representation of the detected indicium is stored until the associated one-shot circuit can respond thereto. As an example, if a length of tape is reversed at the transcription site so that the indication provided by the meter 198 is incremented, and then an equal length of tape is advanced past the transcription site, but before such length of tape is fully advanced, an equal length of tape is advanced at the dictation site, it is appreciated that, if the flip-flop circuits were omitted, the meter 198 might be incremented in response to the tape reversal at the transcription site and might then be again incremented in response to the tape advance at the dictation site. A proper decrement in the meter indication in response to the tape advance at the transcription site would not be effected if it occured immediately following the detection of an indicium at the dictation site. However, by using the illustrated flip-flop circuits, the detection of an indicium is stored until it is used to properly increment or decrement the indication provided by the meter 198.

The respective timing circuits are provided to permit an activated solenoid to fully restore to its quiescent condition before it or the other solenoid subsequently is activated. This ensures that an output pulse produced by a one-shot circuit will not be ineffectual. Consequently, the meter 198 is responsive to each detected indicium so as to provide an accurate indication of the productivity of the dictation system.

When the total amount of dictated tape has been transcribed, and when no further dictation operation is in progress, the AND gate 176 supplies an activating signal to the pulse generator 184 which, in turn, supplies plural pulses to energize the count-down solenoid energizing coil 126. The resultant pulsing of the count-down solenoid 126' acts as a "fail safe" feature and ensures that the wiper element 192 is properly positioned such that a minimum or reference voltage is derived thereat. Accordingly, the meter 198 provides a suitable indication as to the complete transcription of all dictated information.

Record/Reproduce Station Availability Control

It is recognized that the voltage supplied to the meter 198 by the wiper element 192 of FIG. 3 is a "transcription backlog" representing voltage. This voltage represents the physical amount of dictated tape which is awaiting transcription and, therefore, also represents the physical amount of tape which is available for further dictation. It should be apparent that the determination as to whether a record/reproduce station should be made available to receive further dictation is a function not only of the physical amount of tape available for dictation but is also a function of the efficiency of the transcribing operator associated with the record/reproduce station. In many instances, a record/reproduce station having a smaller amount of tape conditioned to receive dictation but having a highly efficient transcribe operator associated therewith will actually have a higher capacity for receiving further dictation than another record/reproduce station which is provided with a larger amount of tape conditioned for receiving dictation but being operated by a relatively inefficient transcribe operator. Accordingly, it is preferred to modify the backlog voltage supplied to each meter in accordance with a representation of the efficiency of an associated transcribe operator to produce a virtual capacity output voltage. This virtual capacity output voltage is a more accurate representation of the actual capacity of the record/reproduce station to receive additional dictation and can be applied to the meter 198 to provide a corresponding indication of, for example, the time required for new dictation to be transcribed, e.g., "turn-around" time. In the central dictation system wherein plural record/reproduce stations can be individually selected, the virtual capacity output voltages are used to determine which, if any of these stations, should be made available for communication with a remote dictate station.

The foregoing function is performed by the apparatus illustrated in FIG. 4. The illustrated apparatus is provided with three combining circuits 202, 204 and 206, each combining circuit adapted to produce a virtual capacity output voltage for representing the virtual capacity of an associated record/reproduce station to receive further dictation. Since only three record/reproduce stations have been illustrated in FIG. 1, only three combining circuits are illustrated in FIG. 4. As is appreciated, the number of combining circuits should be equal to the number of record/reproduce stations which are to be provide.

The combining circuits are substantially identical and only one of which will be described in detail. As an example, the combining circuit 202 is adapted to receive a backlog voltage and to modify this voltate as a function of the efficiency of operation of a transcribe operator. Accordingly, respective backlog and efficiency voltages may be applied to terminals 207 and 209 which, in turn, are connected to the combining circuit 202 by resistors 208 and 210. It is appreciated that the efficiency representing voltage applied to the terminal 209 is produced in response to the manual operation of a control device 43 provided at the supervisory console 40. The control device may comprise a potentiometer, heostat or the like which is adapted to produce a variable voltage in response to the manual operation of a control knob therefor. As is understood, the remaining control devices 45 and 47 are adapted to supply efficiency representing voltages to the terminals 213 and 217, respectively. Typically, the efficiency representing voltage may be a function of the count displayed by the transcribe counting device per unit time.

The combining circuit 202 is adapted to produce a weighted representation of the backlog voltage supplied to the terminal 207. The weighting factor is determined by the efficiency representing voltage applied to the terminal 209. Accordingly, the combining circuit 202 thus may comprise a conventional weighting circuit, such as multiplying circuit, or the like.

As an alternative embodiment, the combining circuit may comprise a gain controlled amplifer for amplifying the backlog voltage with variable gain; the gain being a function of the efficiency of the transcribe operation. For example, the aforenoted potentiometer which is manually adjusted may be disposed in the gain determining circuit of such an amplifier. As a result of the operation of the combining circuits, respective virtual capacity voltages are produced. It is appreciated that the virtual capacity voltage having the highest amplitude represents that the associated record/reproduce station has the least capacity to receive further dictation. This low capacity may reflect a very small amount of available tape conditioned for dictation, or the efficiency of the transcribe operator may be relatively low, or the low capacity may be a combination of these factors. Conversely, the virtual capacity voltage having the lowest amplitude represents that the associated record/reproduce station has the greatest capacity to receive further dictation. In any event, the respective virtual capacity output voltages are supplied to a comparator circuit 200 and, if desired, to the meter 198.

In one embodiment of the central dictation system wherein the present invention finds ready application, it is preferred to render the one record/reproduce station which has the greatest virtual capacity for receiving further dictation available to communicate with a remote dictate station. In an alternative embodiment of the central dictation system, it is preferred to render those record/reproduce stations' which have less than a predetermined amount of virtual dictation capacity unavailable to communicate with remote dictate stations. In either embodiment, those record/reproduce stations which are rendered unavailable for further communication are precluded from being seized, either manually by operation of an appropriate switch, or automatically by the operation of an automatic switching matrix, by remote dictate stations.

Let it be assumed that the record/reproduce station having the greatest virtual dictation capacity is rendered available for further communication. Accordingly, the comparator circuit 220 may comprise a conventional level comparison device adapted to determine which of the input voltages applied thereto admits of the lowest amplitude. An output signal is supplied to a particular output terminal which indicates that the corresponding input voltage exhibits the lowest amplitude. As shown, the comparator circuit 220 is provided with three output terminals, each being associated with a corresponding input terminal, the respective input terminal being supplied with virtual capacity output voltages as produced by the combining circuits 202, 204 and 206. Thus, if the record/reproduce station 18 has the greatest virtual dictation capacity, it is appreciated that the voltage produced by the combining circuit 202 exhibits the smallest amplitude and, therefore, a corresponding signal is supplied to the record/reproduce station 18 by the comparator circuit 220 which renders that record/reproduce station available to communicate with any remote dictate station. Similarly, if the record/reproduce station 22 has the greatest virtual dictation capacity, the comparator circuit 222 renders that record/reproduce station available. Similarly, the record/reproduce station 26 is rendered available if that record/reproduce station has the greatest virtual dictation capacity. It is recognized that the remaining record/reproduce station are rendered unavailable to communicate with a remote dictate station, and all remote dictate stations are prevented from seizing those record/reproduce stations.

In the alternative embodiment wherein the comparator circuit 220 is adapted to determine which of the virtual capacity output voltages do not exceed a predetermined threshold level, the comparator circuit may comprise a plurality of individual threshold detectors. In that embodiment, each of the virtual capacity output voltages produced by the respective combining circuits is compared to a threshold level. If the virtual capacity output voltage associated with a record/reproduce station does not exceed that threshold level, it is appreciated that less than a predetermined amount of virtual dictation capacity is present in that record/reproduce station. Consequently, the comparator circuit 220 supplies a signal to that record/reproduce station which renders that station unavailable for communication with a remote dictate station. It is apparent that, in this embodiment, all of the record/reproduce stations may be rendered unavailable for receiving dictation if all of these stations have less than a predetermined virtual dictation capacity. Conversely, if a sufficient amount of tape is present, and/or the respective transcribe operators exhibit satisfactory operating efficiencies, all of the record/reproduce stations may be made available to receive further dictated information.

It may be appreciated that, in this latter embodiment wherein the virtual capacity output voltages are compared to predetermined threshold levels, the backlog voltages, such as the backlog voltage applied to the terminal 207, need not be modified by the efficiency representation. On the contrary, the backlog voltage merely may be compared to the threshold level which is determined in accordance with the efficiency of the transcribe operator. Hence, it is recognized that the respective backlog voltages would not be compared to identical threshold levels. Rather, each threshold level will be a function of the operating efficiency of an associated transcribe operator.

In a further embodiment, the virtual capacity output voltages produced by the combining circuits are used in the manner now described. It will be assumed that a supervisory operator selects various ones of the transcribe stations to be temporarily non-operating, for example, when a transcribe operator is absent, or the like. This selection results in the production of corresponding virtual capacity output voltages of relatively higher amplitude. Consequently, the associated record/reproduce stations will be rendered unavailable for communication with the remote dictate stations. Now, it, because of the accumulation of dictation, all of the communicating record/reproduce stations cause virtual capacity output voltages of even higher amplitude to be produced, then the comparator circuit will render a temporarily non-operating record/reproduce station available to receive dictation. Thus, even though this dictated information will not be transcribed immediately, it nevertheless will be recorded even though none of the operating record/reproduce stations has sufficient capacity to receive further dictation.

If the virtual capacity output voltages are applied to associated meters, such as meter 198, a suitable switch, not shown, may be provided to permit a meter indication with respect to an appropriate indicating scale. Thus, the meter is adapted to indicate the physical quantity of dictated tape which is awaiting transcription (and, hence, the quantity of tape which is available to receive dictation), and also the time required for new dictated information to be transcribed, i.e., the "turn-around" time associated with that record/reproduce station.

While the present invention has been particularly shown and described with reference to a certain preferred embodiment, it will be obvious to those of ordinary skill in the art that various changes and modifications in form and details may be made without departing from the spirit and scope of the invention. For example, various alterations may be effected in the described circuitry. Various discrete circuit components may be replaced by conventional logic circuit elements and alternative logic circuitry may be used in place of those elements illustrated herein. It is therefore intended that the appended claims be interpreted as including the foregoing and other such changes and modifications, of these elements illustrated herein. It is therefore intended that the appended claims by interpreted as including the foregoing and other such changes and modifications.

What is claimed is:

1. In recording/reproducing apparatus having a dictation site whereat audio signals are recorded on a movable record medium, and a transcription site whereat audio signals are reproduced from said record medium, apparatus for providing an indication of the cumulative amount of recorded audio signals awaiting transcription, comprising:

first means for producing first output signals representing the quantity of record medium advanced past said dictation site;

second means for producing second output signals representing the quantity of record medium advanced past said transcription site; and indicating means responsive to said first and second output signals and including output voltage generating means for generating an output voltage representing the net difference between the quantity of record medium advanced past said dictation site and the quantity of record medium advanced past said transcription site, said output voltage being increased in response to said first output signals and decreased in response to said second output signals.

2. Apparatus in accordance with claim 1 further comprising inhibit means for inhibiting the operation of said first means when said record medium is reversed with respect to said dictation site, said first means being inhibited until all of the record medium which had previously been advanced past said dictation site is again advanced therepast.

3. Apparatus in accordance with claim 1 further comprising means for adding to said output voltage when said record medium is reversed with respect to said transcription site.

4. Apparatus in accordance with claim 3 wherein said first means comprises first sensing means fixedly disposed at said dictation site for sensing the quantity of record medium advanced therepast; and first pulse generating means for producing a first pulse signal when a predetermined amount of said record medium has been sensed by said first sensing means.

5. Apparatus in accordance with claim 4 wherein said second means comprises second sensing means fixedly disposed at said transcription site for sensing the quantity of record medium advanced therepast; and said pulse generating means for producing a second pulse when a predetermined amount of said record medium has been sensed by said second sensing means.

6. Apparatus in accordance with claim 5 wherein said means for adding comprises third pulse generating means for producing a third pulse when said second sensing means senses a predetermined amount of record medium reversed therepast; and means for increasing said output voltage in response to said third pulse.

7. In a magnetic tape dictation system wherein information is recorded on and played back from a magnetic tape at a dictation site and previously recorded information is reproduced from said magnetic tape at a transcription site, and wherein said magnetic tape is provided with indicia at spaced apart locations therealong, apparatus for indicating the cumulative amount of recorded tape awaiting transcription, comprising:
first indicia sensing means at said dictation site for producing a first output signal representing the quantity of tape upon which information has been recorded at said dictation site;
first storage means for storing said first output signal;
first pulse generating means coupled to said first storage means for producing a first pulse signal in response to said stored first output signal;
second indicia sensing means at said transcription site for producing a second output signal representing the quantity of tape from which recorded information has been reproduced;
second storage means for storing said second output signal;
second pulse generating means coupled to said second storage means for producing a second pulse signal in response to said stored second output signal;
inhibit means responsive to the pulse signal produced by one of said first and second pulse generating means for inhibiting the other pulse generating means from producing a pulse signal; and
indicating means responsive to said first and second pulse signals for providing an indication representing the quantity of tape upon which information has been recorded less the quantity of tape from which recorded information has been reproduced.

8. Apparatus in accordance with claim 7 further comprising tape reversal sensing means coupled to said second indicia sensing means for producing a third pulse signal representing the quantity of tape which is moved in a reverse direction past said transcription site, said third pulse signal being inhibited by inhibit means if a pulse signal is produced by one of said first and second pulse generating means; and wherein said indicating means comprises incrementing solenoid means energized in response to the first and third pulse signals; decrementing solenoid means energized in response to the second pulse signal; and variable voltage generating means responsive to each energization of said incrementing solenoid means for producing an incrementally increasing voltage, and responsive to each energization of said decrementing solenoid means for producing a decrementally decreasing voltage.

9. Apparatus in accordance with claim 8, further comprising means for providing a representation of the efficiency of a transcribing operation; and means for modifying the voltage produced by said variable voltage generating means with said representation to produce an output voltage.

10. In a central dictation system having a plurality of record/reproduce stations each including a record medium upon which dictated information is recorded and from which recorded information is reproduced, a plurality of transcribe stations connected to respective ones of said record/reproduce stations for controlling transcribe operations whereby recorded information is reproduced from said record medium when said record medium is advanced past a transcription site, and a plurality of remote dictate stations any one of which is adapted to communicate with any one of said record/reproduce stations whereby dictated information is recorded on said record medium when said record medium is advanced past a dictation site, apparatus for controlling the availability of a record/reproduce station for communication comprising:
means associated with each record/reproduce station for generating a variable voltage representing the quantity of recorded dictated information awaiting transcription;
means for providing a representation of the respective operating efficiencies at which the respective transcribing operations are performed;
combining means for combining the variable voltage generated by the variable voltage generating means associated with a record/reproduce station with the efficiency representation associated with a transcribing operation performed at said record/reproduce station for producing a voltage representing the amount of record medium at said record/reproduce station available for further recording; and
means for determining which of said plurality of record/reproduce stations has the greatest amount of record medium available for further recording and for rendering that record/reproduce station available to establish communication with a remote dictate station.

11. In a central dictation system having a plurality of record/reproduce stations, each including a record medium upon which dictated information is recorded and from which recorded information is reproduced, a plurality of transcribe stations connected to respective ones of said record/reproduce stations for controlling transcribe operations whereby recorded information is reproduced from said record medium when said record medium is advanced past a transcription site, and a plurality of remote dictate stations any one of which is adapted to communicate with any one of said record/reproduce stations whereby dictated information is recorded on said record medium when said record medium is advanced past a dictation site, apparatus for controlling the availability of a record/reproduce station for communication comprising:

means associated with each record/reproduce station for generating a variable voltage representing the quantity of recorded dictated information awaiting transcription;

means for supplying voltages representing the respective operating efficiencies at which the respective transcribing operations are performed;

combining means for combining the variable voltage generated by a variable voltage generating means associated with a record/reproduce station with the efficiency representing voltage associated with a transcribing operation performed at said record/reproduce station for producing a voltage representing the amount of record medium at said record/reproduce station available for further recording; and means for determining whether the amount of record medium available for further recording at said record/reproduce stations as represented by said produced voltages is less than a predetermined amount and for preventing a remote dictate station from establishing communication therewith.

12. In a magnetic tape dictation system wherein information is recorded on and played back from a magnetic tape at a dictation site and previously recorded information is reproduced from said magnetic tape at a transcription site, and wherein said magnetic tape is provided with indicia at spaced apart locations therealong, apparatus for indicating the cumulative amount of recorded tape awaiting transcription, comprising:

first indicia sensing means at said dictation site for producing a first output signal representing the quantity of tape upon which information has been recorded at said dictation site;

second indicia sensing means at said transcription site for producing a second output signal representing the quantity of tape from which recorded information has been reproduced;

tape reversal sensing means coupled to said second indicia sensing means for producing a third output signal representing the quantity of tape which is moved in a reverse direction past said transcription site;

first, second and third storage means for storing representations of said first, second and third output signals, respectively;

first, second and third pulse generating means coupled to said first, second and third storage means, respectively, for generating respective pulse signals in response to said respective stored representations;

first, second and third inhibit means coupled to said first, second and third pulse generating means, respectively, each inhibit means responding to a respective pulse signal for applying an inhibit signal of predetermined duration to the remaining pulse generating means to thereby inhibit the generation of a subsequent pulse signal for a predetermined time; and indicating means responsive to said first, second and third output signal for providing an indication representing the quantity of tape upon which information has been recorded less the difference between the quantity of tape from which recorded information has been reproduced and the quantity of tape which has been reversed past the transcription site.

* * * * *

UNITED STATES PATENT AND TRADEMARK OFFICE
CERTIFICATE OF CORRECTION

PATENT NO. : 3,965,484
DATED : June 22, 1976
INVENTOR(S) : Bjorn J. Matz and Paul F. Rivers It is certified that error appears in the above-identified patent and that said Letters Patent are hereby corrected as shown below:

Column 22, line 20, "operation" should be -- operator --.

Signed and Sealed this

Fourteenth Day of September 1976

[SEAL]

Attest:

RUTH C. MASON
Attesting Officer

C. MARSHALL DANN
Commissioner of Patents and Trademarks